No. 876,330. PATENTED JAN. 14, 1908.
W. G. CLARK.
PROCESS OF MAKING INCANDESCENT LAMP FILAMENTS.
APPLICATION FILED OCT. 4, 1906.
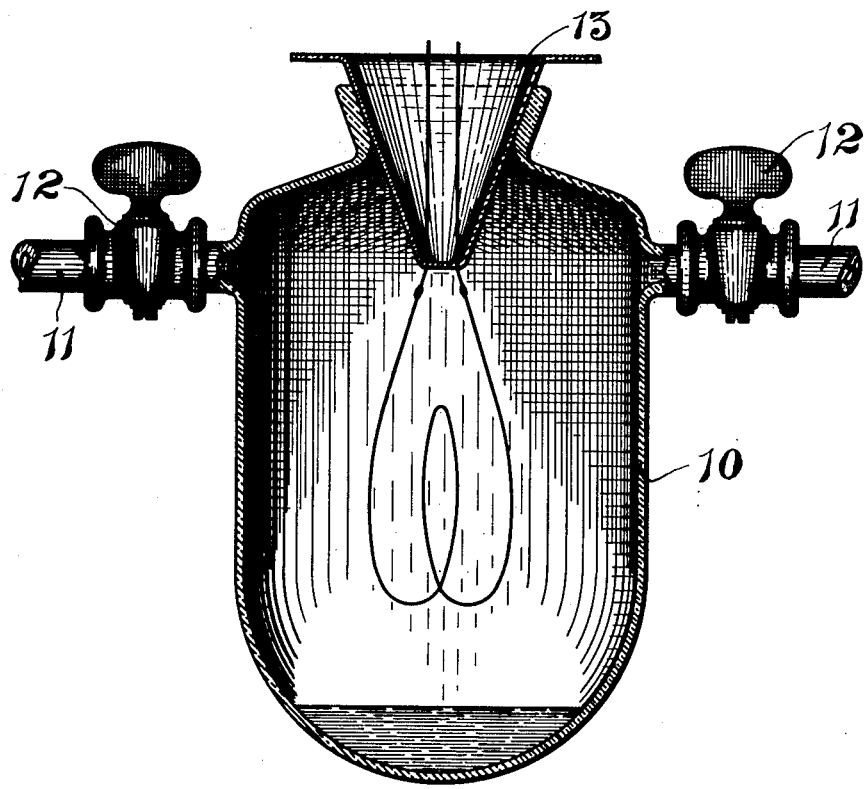

UNITED STATES PATENT OFFICE.

WALTER G. CLARK, OF NEW YORK, N. Y., ASSIGNOR TO PARKER-CLARK ELECTRIC COMPANY, OF NEW YORK, N. Y., A CORPORATION OF NEW JERSEY.

PROCESS OF MAKING INCANDESCENT-LAMP FILAMENTS.

No. 876,330.   Specification of Letters Patent.   Patented Jan. 14, 1908.

Application filed October 4, 1906. Serial No. 337,331.

*To all whom it may concern:*

Be it known that I, WALTER G. CLARK, of the city, county, and State of New York, have invented a new and Improved Process of Making Incandescent-Lamp Filaments, of which the following is a full, clear, and exact description.

My invention relates to improvements in the process of making or treating filaments for incandescent lamps and especially for making filaments having a combination of silicon and carbon or at least containing silicon. Such filaments are generally made by the decomposition of volatile chlorids of silicon by means of heat in an atmosphere of hydrogen, hydrocarbon gas or other gas inert to silicon to bring about the ready decomposition of the chlorids and to cause the silicon to be deposited in the proper form upon a conducting base. A common way of carrying the above action into effect is to heat to incandescence a carbon filament by passing an electric current through it while the said filament is in an atmosphere such as described and in the presence of some volatile chlorid of silicon or silicon in some volatile form. A difficulty in carrying into effect this method of obtaining silicon and carbon in combination, is that it is hard to get a uniform product and moreover unless the process is watched with the greatest care, the chlorin after being once freed, is apt to recombine with the silicon.

The object of my present invention is to remove this objection and I do this by including in the atmosphere of the filament which is being treated some substance which will enter into combination with either free chlorin or hydrochloric acid gas formed by the combination of the hydrogen contained in the atmosphere in which the reaction takes place and the chlorin freed by the decomposition of the chlorids. This reagent may be mercury, metallic sodium, potassium or other mineral or gaseous substance which will readily enter into the combination with the chlorin or hydrochloric acid gas without freeing any oxygen or other material which would be liable to enter into combination with the silicon. I have found that mercury is well suited to the above requirements and doubtless many other things may be found but it will be seen that the gist of the invention lies in having the deposition of silicon on the conducting base take place in the presence of some material which has a greater affinity for chlorin or hydrochloric acid gas than has the silicon.

Reference is to be had to the accompanying drawing, in which the figure illustrates a simple laboratory means of carrying the process into effect.

I have shown the receiver 10, as containing mercury and it will be noticed that the mercury is in close proximity to the filament under treatment, so that when the filament is heated to incandescence by the passage of a current through it, the mercury in the partial vacuum will be heated to the vaporizing point thus rendering the mercury active and causing it to combine readily with the chlorin which is freed by the reduction process.

As shown in the drawings, 10 represents an ordinary receiver having tubes 11 in connection therewith for the introduction and removal of gases, and the tubes 11 have suitable cocks 12. The receiver has a suitable stopple 13 in which the filament may be held in any convenient way as shown. When the filament is to be treated the silicon chlorid such as tetra chlorid of silicon and a gas which contains carbon are introduced into the receiver and a little mercury can also be placed in the receiver as the drawing shows, or some other substance which has a great affinity for chlorin or hydrochloric acid gas (HCl) and which will not free oxygen or other material detrimental to the combination of carbon and silicon. If now a current is passed through the filament the chlorid of silicon is decomposed and united with the carbon in the form of a deposit upon the filament and this deposit can be nicely regulated as the freed chlorin combines with the mercury, sodium or other material direct or unites with the hydrogen forming (HCl) which in turn unites with the mercury or other reagent and so does not reunite with the silicon of the filament simply because the mercury or other substance has a greater affinity for chlorin and HCl than has the silicon or combination rich in silicon.

Having thus fully described my invention, I claim as new and desire to secure by Letters Patent,—

1. The herein described process of making incandescent electric lamp filaments, which consists in heating a filament in the presence of a mixture composed of a volatile carbonaceous compound together with a volatile silicon compound containing chlorin and also in the presence of a substance having a greater affinity for chlorin than has silicon, whereby the silicon is deposited upon the heated filament.

2. The herein described process of making electric lamp filaments, which consists in heating the filament in the presence of a volatile carbonaceous compound, a volatile silicon compound containing chlorin, and vaporizing mercury by the heat of the filament, whereby the freed chlorin combines with the mercury, and the silicon is deposited upon the filament.

3. The herein described process of making incandescent lamp filaments, which consists in heating a filament by passing a current of electricity through it in the presence of a volatile compound containing carbon, and a volatile compound containing silicon and chlorin and also in the presence of a substance having a greater affinity for chlorin than has silicon.

4. The herein described process of making incandescent lamp filaments, which consists in heating a filament by passing a current of electricity through it in the presence of a volatile compound containing carbon, a volatile compound containing silicon and chlorin, and also in the presence of a heated mercury vapor, whereby the mercury vapor absorbs the chlorin freed by the decomposition of the silicon compound.

WALTER G. CLARK.

Witnesses:
WARREN B. HUTCHINSON,
FRANK L. STUBBS.